Sept. 3, 1929.  G. G. LYNCH ET AL  1,727,295
VALVE
Filed Dec. 8, 1927

Inventors
Geo. G. Lynch and
Lynn B. Tillery.
By Cameron, Kirkham & Sutton
Attorneys Patented Sept. 3, 1929.

1,727,295

UNITED STATES PATENT OFFICE.

GEORGE G. LYNCH AND LYNN B. TILLERY, OF WILMINGTON, NORTH CAROLINA, ASSIGNORS TO KENNEDY CORPORATION, OF BALTIMORE, MARYLAND, A CORPORATION OF MARYLAND.

VALVE.

Application filed December 8, 1927. Serial No. 238,640.

This invention relates to diaphragm check valves and more particularly to diaphragm terminal check valves such as are used in pressure oiling systems and the like.

Valves of this type are generally subject to exacting service requirements. In locomotive lubrication, for example, pressure lubrication systems often operate at about three hundred pounds per square inch, and the terminal check valves therein employed receive, and should require very little attention—yet the failure of one of them may result in serious consequences. Furthermore, such valves must in many cases be located in relatively inaccessible places, thus increasing maintenance difficulties and necessitating small and compact valve structures. The design of the valve therefore becomes a matter of great importance. The construction must be such that the valve is small and compact, so as to occupy a minimum of space and to be readily placed and connected in any position or vice versa. At the same time, the valve must embody with these features the requisite strength and reliability to give long life and certain operation under continued usage with little attention, and the requisite simplicity of design and economy of construction to be commercially practicable.

It is an object of the present invention generally to provide an improved diaphragm check valve having the above-mentioned desirable characteristics, such as compactness and economy of space and weight, combined with strength and ruggedness of construction, which is simple, efficient and reliable.

Another object is to provide a novel diaphragm check valve having its parts including inlet and outlet conduits associated in axial relation, whereby said valve may be connected directly in a pressure line without necessitating bends, turns, right angle connections, etc.

A further object is to provide novel means in a diaphragm check valve for conducting a fluid pressure medium to said diaphragm, whereby the valve is opened, and for simultaneously producing adjacent the valve outlet a region of turbulent flow whereby a high velocity atomized delivery from said outlet is produced.

Other objects will appear as the description of the invention proceeds.

The invention is capable of a variety of mechanical expressions, one of which is shown in the accompanying drawings, but it is to be expressly understood that the drawings are for purposes of illustration only and that the invention is not limited thereto or otherwise than by the appended claims.

In said drawings, Fig. 1 is a perspective view of the valve;

Figure 1:
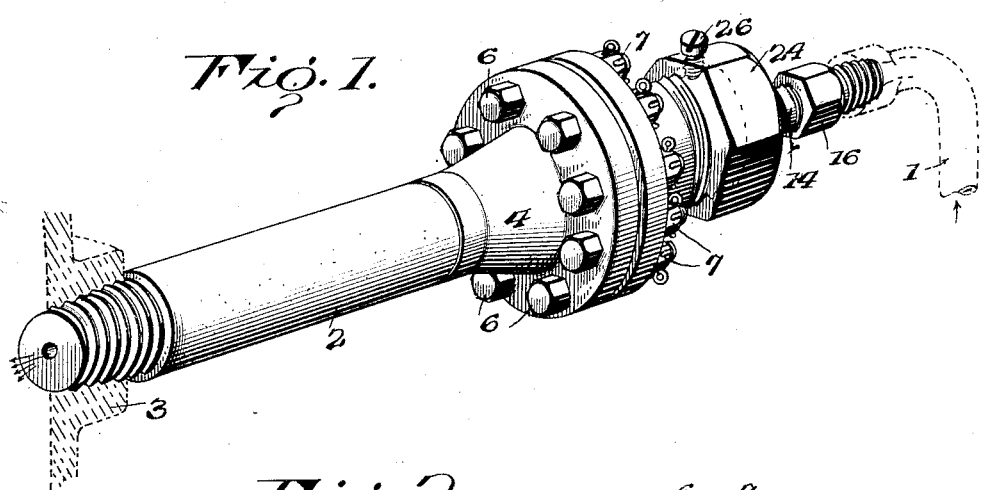

Referring to the drawings, wherein like reference numerals indicate like parts throughout the several views, Fig. 1 shows a valve constructed according to the invention and connected in a line comprising a fluid conduit or pipe 1 and a delivery conduit or pipe 2. The pipe 1 may be an oil line in a pressure lubrication system such as employed on locomotives, and the pipe 2 may if desired be a suitable atomizing tube inserted in the wall 3 of a steam cylinder or other member to be lubricated.

Figure 2:
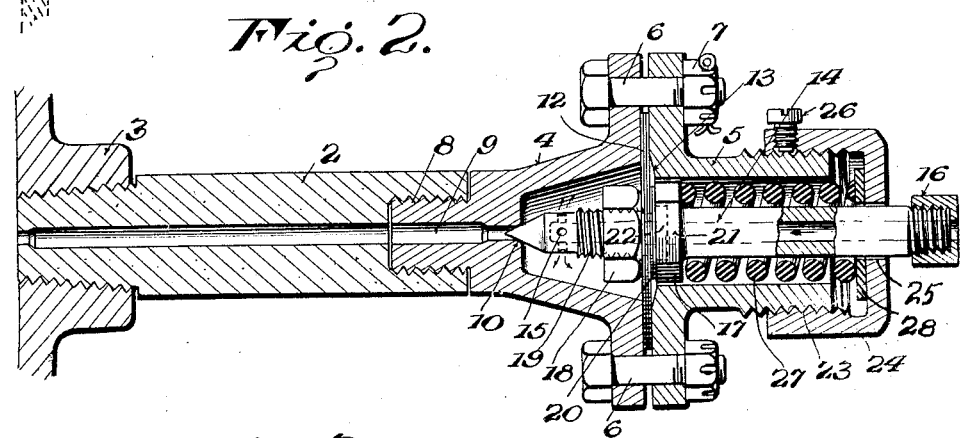
Fig. 2 is a longitudinal sectional view of the valve.

As shown in Fig. 2, the valve body may comprise two cooperating members 4 and 5, preferably having flanges which are connected together as by means of bolts 6 and nuts 7. Preferably, the part 4 is screw threaded at 8 for engagement with the delivery pipe 2, and is provided with a delivery opening 9 and valve seat 10 for any suitable type of valve such as the needle valve 11. A diaphragm 12 of any suitable type extends across the valve body and constitutes together with the valve body 4 and valve 11 a normally closed pressure chamber. In the form shown, the diaphragm 12 comprises a plurality of thin discs of suitable material such as spring brass, which are clamped firmly between the flanges of the valve body parts 4 and 5. The part 5 may be slightly recessed as at 13, to provide for movement of the diaphragm.

The valve 11 is provided with a stem 14, which is preferably hollow for a purpose hereinafter set forth. Said stem is provided at its inner end with a port or ports 15 communicating with said pressure chamber; and extends through the valve body, the outer end being suitably connected, as by means of the union fitting 16, with the pipe 1. The stem 14 passes through and is suitably secured to the diaphragm 12, and to this end is provided with a collar or annular shoulder 17 against which the diaphragm 12 is securely clamped by means of a lock nut 18 engaging the threaded portion 19 of the valve stem. Spacing washers or discs 20 may be provided for adjusting the position of the diaphragm relative to the valve stem.

Figure 3:
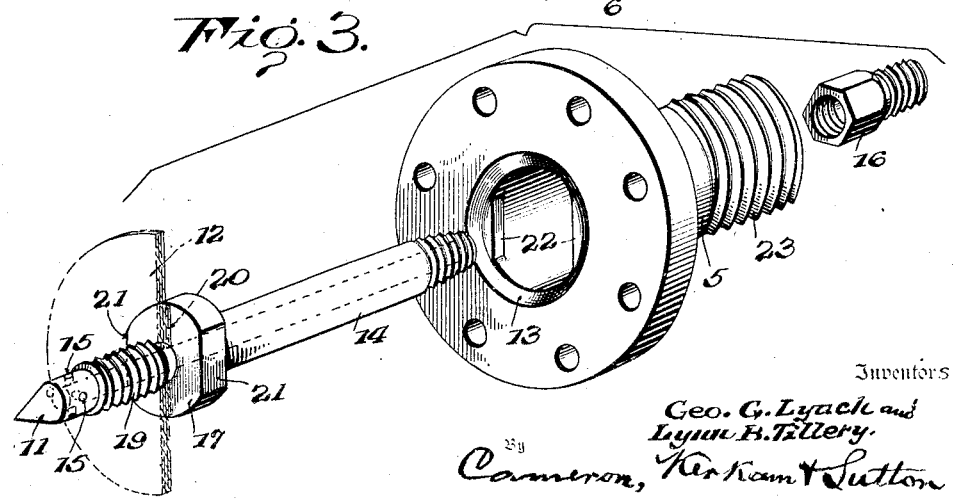
Fig. 3 is an expanded perspective view showing the relation of the various parts.

Suitable means are provided for preventing torsion of the diaphragm due to twisting of the valve stem, and to this end the annular collar 17 is provided with squared portions 21, (Fig. 3) cooperating with squared lugs or projections 22 on the inner face of the valve body 5. The outer end of the valve body part 5 is screw threaded at 23 for engagement with a cap member 24 having an opening 25 through which the valve stem 14 is slidable. Suitable means such as the set screw 26 is provided for locking the cap 24 in any desired position. A coil spring 27 is interposed between collar 17 and a spring seat 28 resting on the cap 24.

The valve 11 is normally held closed by the spring 27. A fluid under pressure in the pipe 1 is conducted through the valve stem 14 and ports 15 into the pressure chamber where it acts on the diaphragm 12, tending to open the valve 11 against the spring 27. The fluid pressure required to open the valve may be set at any desired value by adjusting the spring tension by means of the cap 24. When the pressure in the chamber becomes sufficient to overcome the resistance of the spring 27, as for example, on the pressure stroke of a pump, the valve 11 will open and the fluid will escape through the delivery opening 9 and the pipe 2 to the desired point. On the other hand, the resistance of spring 27 is always large enough to prevent any back pressure in the pipe 2 from opening the valve 11, because of the relatively small effective area against which such back pressure may act.

The extent of opening of the valve 11 is always small owing to the restricted movement of the diaphragm 12. The opening between the valve 11 and valve seat 10 is therefore annular in shape, with the result that a thin annular sheet or cone of fluid is projected therethrough into the opening 9 and pipe 2. This is of particular advantage where it is desired to feed the fluid at high velocity and in a practically atomized state, as in pressure lubricators.

When pressure is placed on the pipe 1 as by connecting the same to a pump, the valve chamber will first fill up and the pressure on the diaphragm will build up on the pressure stroke of the pump until the valve opens slightly. As soon as this occurs, the pressure in the chamber will be relieved almost instantaneously by the escape of fluid from the chamber, and the valve will close and will not open again until the pump is again on the pressure stroke. It will, therefore, be apparent that there is no reaction on the valve stem and that the only wear on the valve is that due to opening and closing movement thereof in a straight line.

It will be observed that all of the parts of the valve, including the inlet and outlet pipes and connections, are assembled in straight line axial relation. The valve may therefore be connected directly in a pressure line without the necessity of bending or twisting the supply line in the immediate vicinity of the valve, and all right angular connections to the valve body are eliminated, such as the usual connection of the pressure line to the valve chamber below the diaphragm. This feature is of great advantage where the valve must be placed in inaccessible locations, or inserted into position between closely adjacent parts of the machinery, etc. Another advantage in the connection of the supply line to the end of the movable valve stem is that the tubing may be readily disconnected and removed for any purpose without in any way disturbing the valve in its position. The construction of the valve is such that the number of parts is reduced to a minimum, and the valve is made small and compact, and yet possesses great strength, ruggedness, and reliability.

While the improved valve has, in the interest of clearness, been described in considerable detail, it will be apparent to those skilled in the art that changes may be made in the construction, arrangement and assembly of the parts, and that some of the parts may be omitted, without departing from the spirit of the invention. Reference is therefore to be had to the appended claims for a definition of the limits of the invention.

What is claimed is:

1. A valve comprising a hollow valve body having a pressure chamber, a diaphragm forming one wall of said pressure chamber, said pressure chamber having a port leading therefrom, a hollow valve stem extending through said valve body into said pressure chamber and secured to said diaphragm, a valve on said stem controlling said port, the wall of said stem having a port intermediate said valve and diaphragm.

2. A valve comprising a hollow valve body, a hollow valve stem connected to a lubricant supply source and extending through said body, a pressure chamber in said body having an exit port, a valve on said stem controlling said exit port, a diaphragm forming one of the walls of said pressure chamber and connected to said stem, said stem having a plurality of ports through its wall and within said chamber 3. A valve comprising a hollow valve body, a valve seat therein, a valve engaging said seat, a diaphragm closing said body whereby said diaphragm, body, and valve constitute a pressure chamber, a hollow valve stem extending though said diaphragm and having a port communicating with said pressure chamber, and a spring in said body exterior to said chamber tending to close said valve, said spring surrounding said valve stem.

4. A valve comprising a hollow valve body in two parts, a valve seat in one part thereof, a cap with adjusting nut for the other end of said body, a diaphragm in said body intermediate said valve part and cap, a hollow valve stem extending through said cap adjusting nut and diaphragm and having a port or ports adjacent said valve seat, and a spring interposed between said diaphragm and cap adjusting nut and surrounding said stem.

5. A valve comprising a hollow valve body and cap, a valve in the body end thereof, a cap adjusting nut having threaded engagement with the cap end thereof, a diaphragm intermediate said cap end and valve end, a hollow valve stem passing through and secured to said diaphragm and passing slidably through said cap adjusting nut, said stem being connected at its outer end to a fluid conduit and having a port or ports adjacent said valve, cooperating shoulders on said stem and valve body to prevent twisting of said stem, and a coiled spring between said cap adjusting nut and diaphragm surrounding said stem.

6. A valve comprising a hollow valve body, a valve in one end thereof, a cap for the other end thereof, a diaphragm intermediate said valve and cap, a hollow valve stem passing through said diaphragm and cap, an annular shoulder on said stem having a squared portion, a member threaded on said stem to clamp said diaphragm against said shoulder, a squared projection on said body engaging the squared portion on said stem, and a spring between said shoulder and cap surrounding said stem, said stem having a port between said diaphragm and valve.

In testimony whereof we have signed this specification.

GEORGE G. LYNCH.
LYNN B. TILLERY.